May 21, 1935.   J. R. OISHEI ET AL   2,002,438
WINDSHIELD STORM SCREEN
Filed March 18, 1931   3 Sheets-Sheet 1
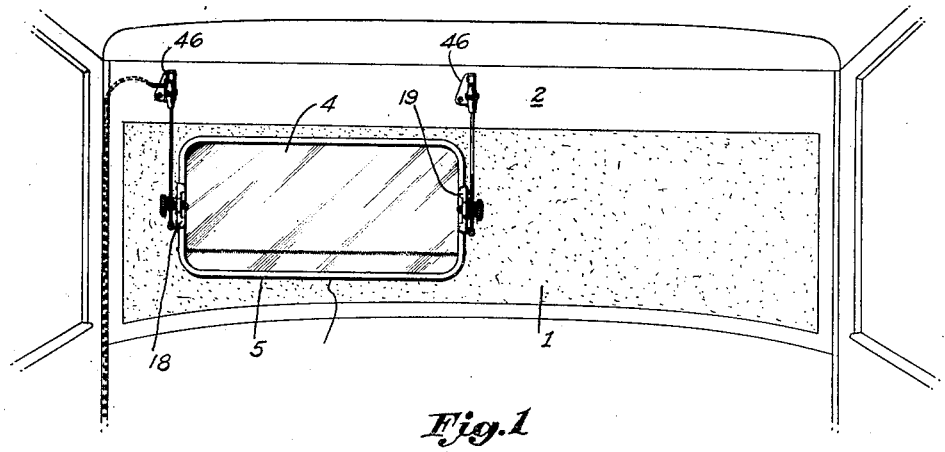
Fig.1
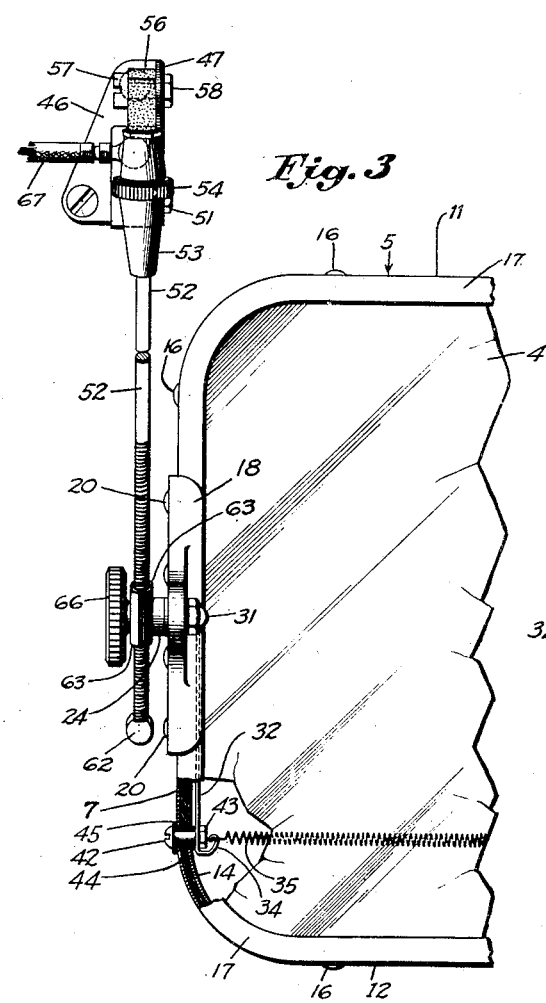
Fig.3
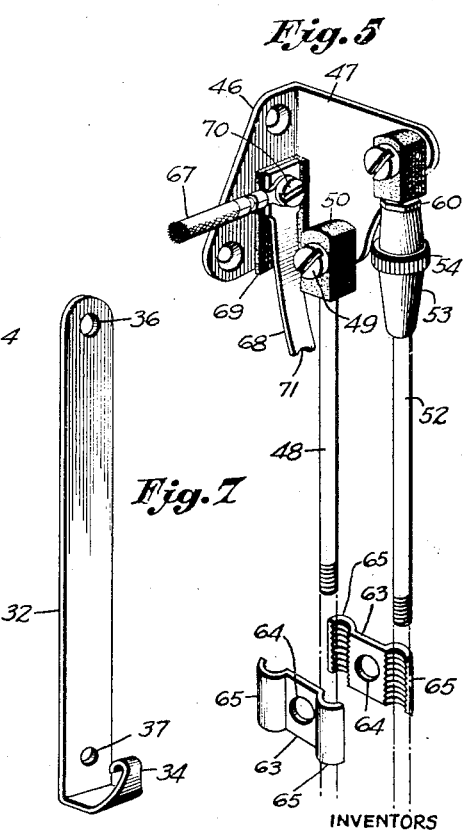
Fig.5
Fig.7
INVENTORS
John R. Oishei
Earl V. Schaal
BY Bean, Brooks & Henry
ATTORNEY

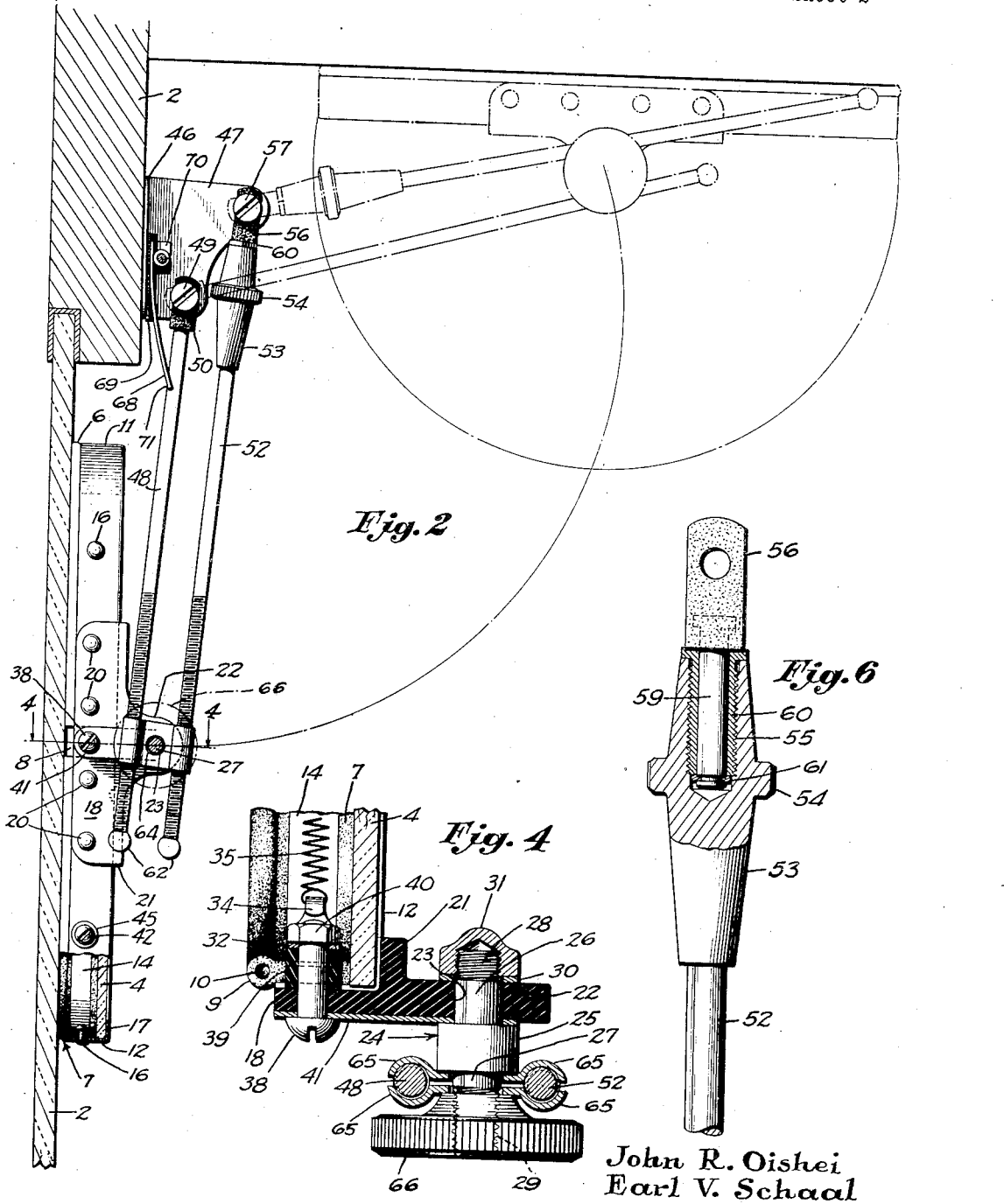

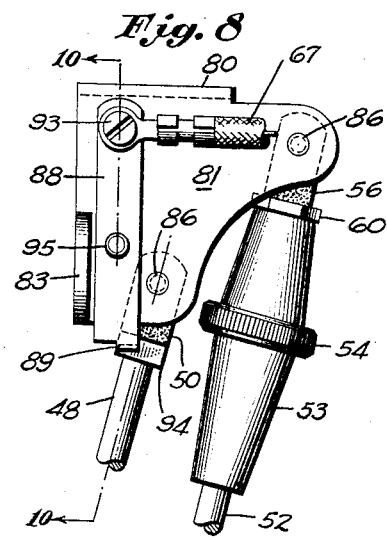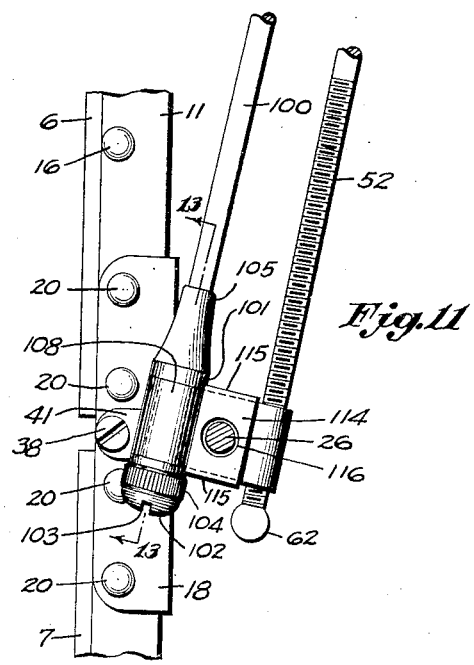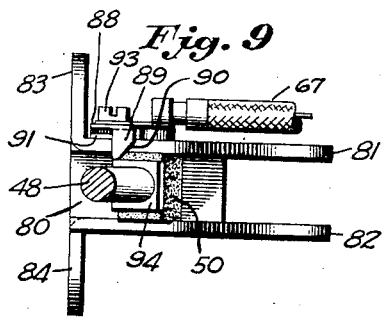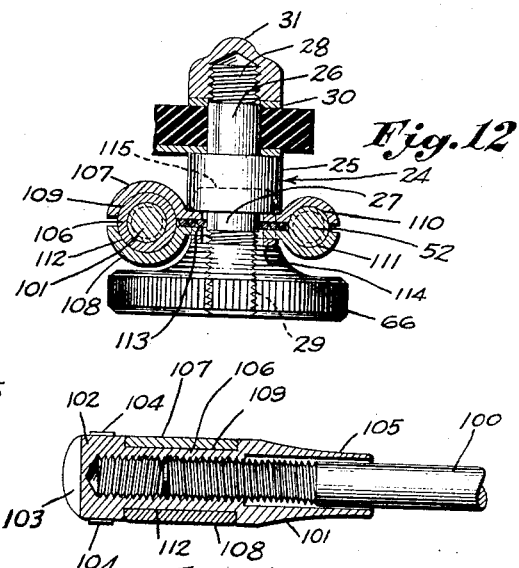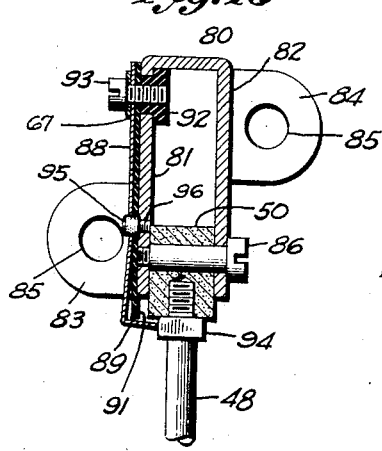

Patented May 21, 1935

2,002,438

UNITED STATES PATENT OFFICE 2,002,438

WINDSHIELD STORM SCREEN

John R. Oishei and Earl V. Schaal, Buffalo, N. Y., assignors to Trico Products Corporation, Buffalo, N. Y.

Application March 18, 1931, Serial No. 523,620

21 Claims. (Cl. 219—19)

This invention relates to devices for maintaining the windshields of vehicles free of snow, ice and sleet and particularly to that general class of attachments embodying a windowed frame supported against the windshield for providing a clear field of vision.

Devices including a section of glass mounted parallel to the windshield and having an air space between, which is warmed by an electrical resistance element or other suitable heating means, have been used previously. Various electrical disadvantages, inconveniences of mounting, and lack of suitable provision for parking when the device is not being used, render these devices not wholly satisfactory.

The present invention provides a windshield appliance of this type and mounting means which render it conveniently movable from an operative position against the windshield to a position off the surface of the windshield where it will not obstruct the driver's vision or cause inconvenience or discomfort to the operator or to the other passengers. The invention comprehends means for mounting the device securely against the windshield and moving it, about the mounting means, to a position against the roof of the vehicle, where it may be secured. Special provision is made for obtaining accurate adjustment of the device after it has been brought into substantial contact with the windshield glass. Improved means have been provided for causing the electrical heating element to be automatically energized when the device is brought into operative position and to effect automatic de-energization upon movement to an inoperative position.

Other features of the invention reside in refinements introduced in the construction of the heating frame, the method of mounting the heating element, and the means employed in introducing and conducting the electrical energy and they will become apparent from a perusal of the following description.

In the accompanying drawings:

Fig. 1 is an interior view of a portion of an automotive vehicle looking toward the windshield with the device positioned thereon.

Fig. 2 is a vertical section through the windshield and the header bar showing the heating device mounted thereon in working position and showing the device in its idle position in broken lines.

Fig. 3 is an elevation of a portion of the device viewed as in Fig. 1.

Fig. 4 is a horizontal section on the line 4—4 of Fig. 2 on an enlarged scale.

Fig. 5 is a perspective view of a mounting bracket showing the pivot arms and the energizing switch associated therewith and showing the clamping members in disassembled relation with the pivot arms.

Fig. 6 is an enlarged sectional elevation of the upper part of the secondary pivot arm showing the swivel connection.

Fig. 7 is a detailed perspective view of one of the resistance element supporting hooks.

Fig. 8 is a side elevation of a modified bracket structure.

Fig. 9 is a bottom plan view of the structure shown in Fig. 8.

Fig. 10 is a vertical section on the line 10—10 of Fig. 8.

Fig. 11 is a partial side elevation of the device showing a modified clamping unit.

Fig. 12 is a horizontal section through the pivot pin and the modified clamping means of Fig. 11.

Fig. 13 is a cross section on the line 13—13 of Fig. 11.

Fig. 1 shows a windshield 1 mounted in a frame 2 which forms part of the body structure of a motor vehicle. The subject device, indicated generally at 3, is shown associated with the windshield in operative relation and has as its principal elements an expanse of transparent material 4 mounted in a frame 5 which is suspended from the header bar above the windshield in a manner which will be hereafter described.

In the present instance the expanse of transparent material 4 takes the form of a substantially rectangular sheet of glass. The frame designated generally as 5 includes upper and lower spacing members 6 and 7, respectively, which are formed of rubber or other material and which combine to extend substantially about the margin of the glass 4 and seat against the windshield 1 to space the glass 4 from the windshield in parallel relation thereto. Between the ends of the spacing members 6 and 7, on each side of the frame, is a space 8. The edges of the spacing members 6 and 7 which are against the windshield are preferably formed with beads 9, Fig. 4, having elongated holes 10 extending therethrough to render the spacing members more resilient and to further cushion the seating of the glass 4 against the windshield.

Upper and lower metallic retaining members 11 and 12, respectively, extend around the outside of the glass and the spacing members to maintain the spacing members 6 and 7 in abutting relation with the glass 4. Metallic strips 14 extend around the interior of the spacing members 6 and 7, imbedded in seats provided therefor in the spacing members, and these strips cooperate with the retaining members 11 and 12 to seat a plurality of rivets 16 which extend through the spacing members and secure them to the retaining members 11 and 12. The retaining members are provided with inwardly turned flanges 17 which seat against the back of the glass 4 and hold the glass against the spacing members. It will be seen that the glass 4 and the elements that make up the frame 5 combine with the windshield glass to form a flat, rectangular compartment which communicates with the atmosphere in the interior of the vehicle only through the space 8 at either side of the frame.

Mounting members 18 and 19 formed of fibre or other rigid, insulating material are secured to the retaining members 11 and 12 at the opposite sides of the frame 5 by rivets 20. Each mounting member has a vertical flange 21 which seats against the flanges 17 of the retaining member and a lug 22, which projects rearwardly of the point of attachment to the frame and has an opening 23 adapted to receive a pivot pin 24. Each pin 24 has an enlarged central portion 25 and reduced portions 26 and 27 at its inner and outer ends respectively which terminate in threaded portions 28 and 29. The portion 26 extends through the opening 23 and is secured by a washer 30 and a nut 31 which engages the threaded portion 28.

Fig. 7 shows in detail one of a pair of opposed vertical strips 32 and 33 which terminate at their lower ends in hooks 34 formed to engage the opposite ends of an electrical resistance coil 35 and support it in a horizontal position in the previously described compartment formed by the frame and the windshield. The coil 35 is positioned near the bottom of the compartment so that the heat which it supplies will be naturally distributed, but it is placed at a sufficient distance from the bottom that it may be seen by the operator of the vehicle who can readily detect any interruption in its efficient operation. Each of the strips 32 and 33 is provided with apertures 36 and 37 at its upper and lower ends respectively by means of which it is mounted within the before-mentioned compartment.

A screw 38 passes through an opening in the left-hand mounting member 18, Fig. 4, and through the opening 8 in the frame 5. The screw 38 extends into the compartment where it passes through the opening 36 in the strip 32 which is spaced from the mounting member by a fibre collar 39 and held in place by a nut 40 threaded to the inner end of the screw 38. A metallic contact strip 41 is held beneath the head of the screw 38 and extends to the pivot pin 24 where it is held between the enlarged central portion 25 thereof and the mounting member 18.

The lower end of the vertical strip 32 is held in position by a screw 42 which passes through the retaining strip 12, the spacing member 7, the inner metallic strip 14, and through the lower aperture 37 in the strip 32 where it engages a nut 43. The screw 42 is surrounded by an insulating bushing 44 and is provided with an insulating washer 45. The strip 33 at the opposite side of the frame is similarly mounted but in this case the contact strip is omitted and the bushing 44 is metallic since it is desired to ground the circuit to the frame at this point.

The before-mentioned means for suspending the heating frame from the header bar of the windshield includes a pair of brackets 46 fastened against the header bar as by screws and having portions 47 thereof extending outwardly from the header bar and in parallel relation to each other. Suspended from each of the extending portions 47 of the brackets is a primary pivot arm 48 mounted for free pivotal movement by a screw 49 passing through an insulating block 50 provided at the upper end of the pivot arm 48 and through an aperture in the extension 47 where it is held by a nut 51. A secondary pivot arm 52 is pivotally suspended from each of the extending bracket portions 47 in the manner shown in Figs. 5 and 6. The upper end of each secondary pivot arm 52 terminates in an enlargement 53 having a knurled gripping portion 54 and a threaded opening 55. The insulating pivot block 56 of the secondary arm is secured to the bracket portion 47 by a screw 57 and a nut 58, Fig. 3, as in the case of the primary arm.

As shown in Fig. 6 a stud 59 imbedded in the insulating block 56 extends downwardly and carries a freely rotatable, externally-threaded bushing 60 which is held in place by a washer 61 secured to the lower end of the stud 59. The threaded bushing 60 is received by the threaded opening 55 in the pivot arm 52, thereby permitting rotation of the pivot arm 52 on its own axis and pivotal movement thereof about the screw 57. The lower ends of both the primary and the secondary arms are threaded and terminate in knob portions 62. Each pair of pivot arms is associated with one of the pivot pins 24 through a pair of clamps 63. Each clamp member comprises a resilient central portion provided with an aperture 64 and semi-circular side portions 65 which are internally threaded. Each pair of clamp members engages a pair of pivot arms and is held in gripping relation therewith by a knurled thumb-nut 66 which engages the outer threaded portion 29 of the pivot pin 24. The flexibility of the central portion of the clamp members insures against mutilation of the threads on either the pivot arms or the clamp members in the event that the clamps are not properly seated when pressure is applied through the nut 66.

Electrical energy is introduced through the medium of a wire 67, Figs. 2 and 5, which, with a flexible contact strip 68 is secured by a screw 70 to an insulating plate 69 carried by one of the brackets 46. The flexible contact strip 68 is provided with a seat 71 which is so located as to contact with the primary pivot arm 48 when the frame is in its operative position.

Reference to Fig. 2 will show that as long as the primary and secondary arms are securely held by the clamp members 63 pivotal movement of these arms is impossible owing to the fact that any pivoting of the arms on the brackets 46 must be accompanied by a change in their relative longitudinal positions. When pressure is removed from the clamps by loosening the thumb nuts 66 the frame 5 may be swung about the brackets 46 on the pivot arms and it is also free to rotate on the pins 24. It may thus be moved to the position shown in broken lines in Fig. 2, where it has been turned so that the windshield side of the frame is against the roof of the vehicle, and it is held in this position by re-tightening the thumb nuts 66.

If, when the frame is in its operative position adjacent the windshield it is desired to bring it into more intimate contact therewith this may be accomplished without completely disengaging the threads of the pivot arms from the threads in the clamps and with greater accuracy than this method would afford by merely loosening the clamps partly and turning the secondary pivot arm therein by means of the swivel joint provided for this purpose. By lengthening the distance between the pivot point of the secondary arm 52 and its engagement with the clamp 63 a force acting at substantially right angles to the plane of the heating frame is brought to bear against the heating frame adjacent the clamp members which urges the heating frame against the winshield and provides a substantially vernier adjustment.

When the frame is in its operative position against the windshield electrical energy is conducted through the wire 67 and the contact strip 68, through the adjacent primary pivot arm 48 and the clamp 63, the contact strip 41, the screw 38 and the hook strip 32, to the resistance element 35, which is grounded at its opposite end to the frame. Upon movement of the frame to its inoperative position the heating circuit is broken by movement of the primary pivot arm 48 away from the contact strip 68.

The foregoing description sets forth a preferred embodiment of the inventive concept but the principles of the invention could be applied in a wide variety of constructions. It has been thought meet to set forth several structural modifications, one in the method of introducing electrical energy and one in the method of associating the pivot arms with the frame.

The former is shown in Figs. 8, 9 and 10 and involves a modified form of mounting bracket at the side where the electrical energy is introduced. This bracket is U-shaped, having a horizontally extending top portion 80 and parallel depending side portions 81 and 82. Vertical fastening lugs 83 and 84 extend at right angles from the side portions 81 and 82, respectively, and are provided with apertures 85 to receive screws or other means of securement to the windshield frame. The support of the pivot arms in the first disclosure is supplanted in the present embodiment by screws 86 which pass through apertures in the side portion 82 and engage at their outer extremities threaded apertures in the parallel side portion 81. The pivot blocks 50 and 56 of the former disclosure are carried by the screws 85 between the side portions 81 and 82.

A contact strip 88 is fastened to the outside of the side portion 81 adjacent its upper edge and extends downwardly to a point immediately below the lower edge of the side portion where it terminates in an inwardly extending flange 89, the inner edge of which is provided with a beveled seat as at 90. The contact strip 88 is insulated from the side portion 81 by a sheet of fibre 91 which lies between the contact strip and the side portion and by a flanged fibre bushing 92 which is disposed in an aperture in the side portion and to which the contact strip is secured by a screw 93. The wire 67 of the first disclosure is also held beneath the head of the screw 93. A pin 95, of fibre or other non-conducting material, has a reduced threaded portion 96 which engages the side portion 81. The extending body portion of the pin registers with apertures in the contact strip and fibre sheet 91 and prevents pivotal displacement of these strips about the screw 93.

The primary pivot arm 48 is provided with a square enlargement 94 adjacent the lower edge of the insulating block 50 and when the primary pivot arm is moved into its downward position, in other words when the frame is brought into operative relation with the windshield, the squared enlargement is brought into camming contact with the beveled edge or seat 90 of the contact strip 88 and closes an electrical circuit which is in other respects the same as the circuit in the former embodiment.

The second modification, which introduces an advantageous variation in the pivot arm and clamp assembly, is shown in Figs. 11, 12 and 13. In this case the primary pivot arm, designated 100 and whose upper end remains as it was in the first disclosure, is threaded at its lower end to receive an adjustable internally threaded bushing 101. The lower end of the bushing 101 is closed as at 102 and is provided with a screw-driver slot 103 and a circumferential knurl 104 so that it may be adjusted longitudinally on the pivot arm either with the fingers or with the aid of a screw-driver. At its opposite end the bushing has an upwardly extending skirt 105 which has a bore of slightly larger diameter than the pivot arm and which serves to conceal any of the threaded portion of the pivot arm which might otherwise project beyond the bushing in certain adjusted positions of the bushing. Intermediate the ends of the bushing is a reduced bearing portion 106 adapted to receive inner and outer complementary clamping members 107 and 108 respectively. The inner clamping member 107, while generally resembling the clamping members 63 has smooth seats 109 and 110 in place of the threaded seats in the members 63. The outer clamping member 108 has a threaded seat 111, for cooperating with the threads on the secondary pivot arm 49, and a smooth seat 112 which cooperates with the seat 109 on the inner clamping member 107 to embrace the bearing portion 106 of the bushing 101. A helical spring 113, conical in form, surrounds the reduced portion 27 of the pivot pin 24 between the clamping members. When the clamping members are in their securing position the spring 113 takes the form of a flat spiral and, when the thumb nut 66 is released the spring 113 urges the clamp members 107 and 108 away from their respective seats.

A retaining clip 114 formed of flat metal extends across the outer face of the outer clamp member 107 and terminates at its upper and lower edges in inwardly extending flanges 115 which are of sufficient depth to preserve alignment between the complementary clamping members when they are released from contact with the pivot arm. The clip 114 has a central aperture 116 to receive the pivot pin 24 and is held in position by the thumb nut 66.

The modified construction outlined above prevents any alteration in the relation between the clamping members and the primary pivot arms excepting that which it is possible to obtain by adjustment of the bushings 101. All of the relative longitudinal movement between the primary and secondary pivot arms that is incurred in moving the frame to and from its operative position takes place between the clamping members and the secondary pivot arm. This construction insures positive horizontal alignment of the frame at all times and also prevents disturbance of the vertical adjustment of the frame when it is moved to and from its inoperative position. There is a minimum of friction between the threaded seats and the pivot arms. This is accountable to three factors, first, longitudinal movement between the pivot arms and the seats is kept at a minimum by determining the position of the clamp with respect to one of the pivot arms, second, by threading only one of the semi-circular seats which grip the secondary pivot arm, and third, by providing the spring 112 to hold the clamp members away from the pivot arms when the thumb nut is released.

While several practical embodiments have been illustrated and described in detail, it will, of course, be understood that the principles of the invention are not limited thereto.

What is claimed is:

1. An attachment for motor vehicle windshields, and the like, including a heating frame, and means for movably mounting the frame adjacent the windshield supporting structure, an arm pivotally secured to the supporting bracket means and engaging the heating frame adjacent its outer extremity, a secondary arm carried by said bracket and engaging said heating frame to restrict free arcuate movement of the heating frame about the supporting bracket means, and means for associating said secondary arm and the heating frame, said means being releasable to change the position of the heating frame.

2. An attachment for motor vehicle windshields, and the like, including a heating frame, and means for movably mounting the frame adjacent the windshield comprising supporting bracket means mounted on the windshield supporting structure, a plurality of arms pivotally carried by the supporting bracket means and engaging the heating frame adjacent their opposite extremities, a secondary arm cooperating with each of the first named arms and connecting said bracket means to said heating frame to restrict the free arcuate movement of the heating frame about the supporting bracket means, and means for releasing said secondary arms to change the position of the heating frame.

3. An attachment for motor vehicle windshields, and the like, including a heating frame, and means for movably mounting the frame adjacent the windshield comprising a supporting bracket, a primary arm pivotally carried by the supporting bracket and supporting the heating frame, a secondary arm connected to said bracket and the heating frame and cooperating with the primary arm to restrict the free arcuate movement of the heating frame about the supporting bracket on the primary arm, means on the heating frame for releasably securing said primary and said secondary arms, said means being releasable to allow the heating frame to be swung from an operative to an inoperative position and vice versa, and means on one of said arms for effecting minor adjustments between said arm and said heating frame to provide for accurately positioning the heating frame with respect to the windshield.

4. An attachment for motor vehicle windshields and the like comprising a heating frame, and means for movably mounting the frame adjacent the windshield including a supporting bracket, a primary arm and a secondary arm each pivotally carried by the supporting bracket in eccentric relation and each connected to the heating frame adjacent its outer extremity, means for releasably securing said primary and said secondary arms to prevent relative movement between the arms, said arms being releasable to allow the heating frame to be swung with the arms to and from an operative position, and means on said secondary arm by which the effective length thereof is varied for effecting minor adjustments between said secondary arm and said heating frame and thereby provide for accurately positioning the heating frame with respect to the windshield.

5. An attachment for motor vehicle windshields and the like which comprises a heating frame, and means movably mounting said frame in operative and inoperative positions, said mounting means comprising a pair of arms pivotally mounted upon the windshield supporting structure and engaging the heating frame adjacent their outer ends, a pair of auxiliary arms pivotally mounted on the windshield structure and slidably engaging the heating frame adjacent their outer ends, and means releasably securing said auxiliary arms against relative sliding with the frame to maintain the heating frame in a desired adjusted position 6. An attachment for motor vehicle windshields and the like which comprises a heating frame, and mounting means therefor, said mounting means including a base secured to the vehicle adjacent the windshield, supporting arms pivotally mounted upon the base, adjustable clamping means on the heating frame for engaging the outer ends of the supporting arms, and position-determining arms also pivoted on the base and engaged by said adjustable clamping means, said adjustable clamping means being releasable to permit relative movement of the arms therein and consequent alteration of the position of the heating frame with respect to the base means and the windshield.

7. An attachment for motor vehicle windshields including a heating frame, and means for removably mounting said frame adjacent the windshield glass comprising a supporting bracket mounted on the surrounding structure of the windshield, a plurality of arms pivotally carried by the supporting bracket in eccentric relation, and means on the frame for releasably engaging the pivot arms, said releasable engagement providing for adjustment of the heating frame from a position against the windshield to a position adjacent the roof of the vehicle out of the line of vision of the operator.

8. An attachment for a motor vehicle having a windshield, comprising supporting means above the windshield, an arm pivoted to the supporting means for movement toward or away from the windshield, a member for being positioned against the windshield, means for attaching said member to the free end of the arm, whereby the member may be moved bodily away from the windshield about the pivot axis of the arm, and means independent from said arm and operating through the attaching means for clamping the member against the windshield, said independent means being manually adjustable to vary the pressure of the member against the windshield.

9. An attachment for motor vehicle windshields including a heating frame, and means for removably mounting said heating frame adjacent the windshield glass comprising supporting bracket means mounted on the surrounding structure of the windshield, a plurality of arms pivotally carried by the supporting bracket, bearing means on the heating frame engaging the arms, and locking means cooperating with the bearing means to normally maintain the heating frame in adjusted position, said pivot arms and said bearing means cooperating, when the locking means is released, to permit movement of said heating frame to an inoperative position and, simultaneously therewith, to permit inversion of the heating frame to facilitate unobtrusive storage thereof when it is not in use.

10. An attachment for motor vehicle windshields and the like comprising a heating frame, and means for removably mounting said heating frame adjacent the windshield glass which includes a bracket secured to the surrounding structure of the windshield, a supporting arm pivotally mounted on the bracket and engaging the heating frame at its outer extremity, and a position-determining arm mounted on the bracket, and means for effectively adjusting the length of one arm relative to the other to vary the contact pressure of the frame on the windshield glass.

11. An attachment for motor vehicle windshields and the like comprising a heating frame, and means for removably mounting said heating frame adjacent the windshield glass which includes a bracket secured to the surrounding structure of the windshield, a supporting arm pivotally mounted on the bracket and engaging the heater frame at its outer extremity, a position-determining arm mounted on the bracket and having threaded engagement with the heating frame adjacent its outer extremity, and a swivel bearing provided in the position-determining arm, intermediate of its connections with the bracket and the heating frame, to allow adjustment of the threaded engagement; the position of the heating frame with respect to the windshield being alterable by varying the relation of the position-determining arm to the heating frame through the treaded engagement.

12. An attachment for motor vehicle windshields and the like comprising a heating frame and means removably mounting said heating frame adjacent the windshield glass which includes a bracket secured to the surrounding structure of the windshield; supporting arms pivotally mounted on the bracket and having their outer ends threaded; clamping jaws on said heating frame provided with semi-circular threaded faces, for cooperation with the outer ends of the supporting arms, and a resilient intermediate portion carrying screw means for exerting pressure on the clamping jaws; said intermediate resilient portion of the clamping jaws serving to cushion the pressure on the supporting arms and prevent mutilation of the threads.

13. In an attachment for the windshield of a motor vehicle, a heating device including an electrical resistance element, bracket means secured to a portion of the vehicle adjacent the windshield, two arms pivoted to the bracket means and supporting said electrical heating element for movement toward or away from the windshield, said arms being in electrical circuit with opposite ends of said resistance element, the part of the bracket means pivoted to one of said arms being in electrical communication with said last mentioned arm and being insulated from the other arm, and a member electrically insulated from said part of the bracket means and from said other arm, said member contacting and electrically communicating with said other arm when the heating device is moved into adjacency with the windshield.

14. An attachment for a motor vehicle having a windshield, comprising supporting means adjacent one edge of the windshield, a pair of substantially parallel arms pivoted on parallel axes to said supporting means, a member for being positioned against the windshield, and a pair of clamping jaws for releasably gripping both arms, at least one of said jaws being pivotally connected to said member.

15. In means for supporting a device in adjacency to the windshield of a motor vehicle, a supporting arm member, a sleeve surrounding one end of said arm member, and a member carried by the device and engaging around said sleeve, the latter being rotatable with respect to both of said members and being screw threaded to one of them whereby the device may be adjusted longitudinally of the supporting arm without rotating said members relative to each other.

16. In an attachment for a motor vehicle having a windshield, an accessory element and means for mounting the same for movement into and out of contact with the windshield, said means comprising a bracket secured to a portion of the vehicle adjacent the windshield, a support element pivoted to the bracket and carrying the accessory element, and a link pivoted at one end to the bracket eccentrically to the first mentioned pivot and connected at the other end to one of said elements, and means for varying the effective length of said link element by manual adjustment.

17. In an electrical heating attachment for motor vehicle windshields, and the like, a heating frame having an electrical resistance element, supporting bracket means adjacent the windshield supporting structure, an arm pivotally secured to the supporting bracket means and engaging the heating frame adjacent its outer extremity, a secondary arm carried by said bracket and engaging said heating frame to restrict free arcuate movement of the heating frame about the supporting bracket means, and means for associating said secondary arm and the heating frame, said means being releasable to change the position of the heating frame.

18. In an electrical heating attachment for motor vehicle windshields and the like, a heating frame having an electrical resistance element, a bracket secured to the surrounding structure of the windshield, a supporting arm pivotally mounted on the bracket and engaging the heating frame at its outer extremity, and a position-determining arm mounted on the bracket, and means for effectively adjusting the length of one arm relative to the other to vary the contact pressure of the frame on the windshield glass.

19. In an electrical heating attachment for motor vehicles, or the like, a heating frame including electrical heating means, and means movably mounting said heating frame adjacent the windshield glass which includes a bracket secured to the surrounding structure of the windshield, a supporting arm pivotally mounted on the bracket for movement toward or away from the windshield, releasable clamping jaws carried by said heating frame to normally grip said supporting arm, and resilient means for spreading the clamping jaws to release said supporting arm upon release of said jaws.

20. In an electrical automotive accessory adapted to be swung into contact with the windshield of an automotive vehicle, a bracket adapted to be secured to the vehicle, a pair of arms each pivoted to said accessory and pivoted at different points to said bracket, said arms being movable about the pivots for carrying said accessory toward or away from said windshield, one of the arms being electrically insulated from said bracket and in electrical communication with said accessory, a contact finger carried by said bracket, said finger contacting with said one of the arms when the arms are moved to carry the accessory into contact with the windshield.

21. In an accessory for a vehicle windshield and adapted for support from a portion of the vehicle adjacent the windshield, a pair of arms pivoted at one end on parallel axes to said portion of the vehicle, a frame pivoted to the opposite end of one of said arms, and means connecting the opposite end of the other of said arms to said opposite end of the first mentioned arm for longitudinal and pivotal movement relative thereto.

JOHN R. OISHEI.
EARL V. SCHAAL.